United States Patent
Clark

(10) Patent No.: US 11,030,587 B2
(45) Date of Patent: Jun. 8, 2021

(54) SYSTEMS AND METHODS FOR PROVIDING ANONYMIZED TRANSACTION DATA TO THIRD-PARTIES

(71) Applicant: MasterCard International Incorporated, Purchase, NY (US)

(72) Inventor: Kyle Patrick Clark, High Ridge, MO (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 1319 days.

(21) Appl. No.: 14/265,944

(22) Filed: Apr. 30, 2014

(65) Prior Publication Data

US 2015/0317613 A1     Nov. 5, 2015

(51) Int. Cl.
| | |
|---|---|
| *G06Q 20/02* | (2012.01) |
| *G06Q 20/08* | (2012.01) |
| *G06Q 20/12* | (2012.01) |
| *G06Q 20/34* | (2012.01) |
| *G06Q 20/40* | (2012.01) |

(Continued)

(52) U.S. Cl.
CPC .............. *G06Q 20/02* (2013.01); *G06F 21/31* (2013.01); *G06F 21/335* (2013.01); *G06Q 20/0855* (2013.01); *G06Q 20/12* (2013.01); *G06Q 20/34* (2013.01); *G06Q 20/40* (2013.01); *G06Q 20/4014* (2013.01)

(58) Field of Classification Search
CPC ....... G06F 21/31; G06F 21/335; G06Q 20/02; G06Q 20/0855; G06Q 20/4014; G06Q 20/12; G06Q 20/34
See application file for complete search history.

(56) References Cited

U.S. PATENT DOCUMENTS 6,327,578 B1 * 12/2001 Linehan ................. G06Q 20/02
                                                                    705/65
7,587,366 B2 *  9/2009 Grim, III ............... G06Q 20/40
                                                                    705/44

(Continued)

OTHER PUBLICATIONS

US 8,626,728 B2, 01/2014, Kalavade (withdrawn)

(Continued)

*Primary Examiner* — Patrick McAtee
*Assistant Examiner* — Edgar R Martinez-Hernandez
(74) *Attorney, Agent, or Firm* — Armstrong Teasdale LLP

(57) ABSTRACT

A computer-implemented method for authorizing access to transaction data to a third-party computer system is implemented by a payment processor computer system coupled to a memory. The method includes receiving a request for access to transaction data associated with a cardholder account, requesting a set of authentication information associated with the cardholder account, authenticating the set of authentication information upon receiving the set of authentication information, and authorizing the third-party computer system to receive transaction data associated with the cardholder account. Upon validation, the payment processor computer system generates an authorization token and provides the authorization token to the third-party computer system. The third-party computer system uses the authorization token and a secure identifier to retrieve transaction data associated with the cardholder account.

16 Claims, 7 Drawing Sheets

(51) Int. Cl.
*G06F 21/31* (2013.01)
*G06F 21/33* (2013.01)

(56) References Cited

U.S. PATENT DOCUMENTS

| | | | | |
|---|---|---|---|---|
| 8,015,117 B1* | 9/2011 | Lillibridge | ........... | G06Q 20/382 |
| | | | | 705/64 |
| 8,682,802 B1* | 3/2014 | Kannanari | ........... | G06Q 20/367 |
| | | | | 705/64 |
| 8,751,788 B2* | 6/2014 | Leach | ................ | H04L 63/0428 |
| | | | | 713/152 |
| 2001/0051902 A1* | 12/2001 | Messner | ................ | G06Q 20/02 |
| | | | | 705/26.81 |
| 2003/0200184 A1* | 10/2003 | Dominguez | ........... | G06Q 20/02 |
| | | | | 705/78 |
| 2003/0220927 A1* | 11/2003 | Iverson | ................ | G06F 21/6254 |
| 2004/0103063 A1* | 5/2004 | Takayama | ............. | G06Q 20/00 |
| | | | | 705/41 |
| 2004/0124966 A1* | 7/2004 | Forrest | .................. | G06Q 20/32 |
| | | | | 340/5.8 |
| 2004/0230593 A1 | 11/2004 | Rudin et al. | | |
| 2005/0165623 A1* | 7/2005 | Landi | .................... | G16H 10/60 |
| | | | | 705/2 |
| 2005/0184145 A1* | 8/2005 | Law | ...................... | H04W 12/08 |
| | | | | 235/380 |
| 2005/0240588 A1* | 10/2005 | Siegel | .................... | G06F 21/10 |
| 2006/0041518 A1* | 2/2006 | Blair | ..................... | G06Q 30/06 |
| | | | | 705/80 |
| 2006/0089919 A1* | 4/2006 | Kidd | ..................... | G06Q 20/12 |
| | | | | 705/75 |
| 2009/0076966 A1* | 3/2009 | Bishop | ................ | G06Q 20/027 |
| | | | | 705/67 |
| 2009/0183250 A1 | 7/2009 | Harada | | |
| 2009/0240594 A1* | 9/2009 | Kerner | .................. | G06Q 20/02 |
| | | | | 705/26.1 |
| 2010/0001058 A1* | 1/2010 | Grovit | .................... | G06Q 20/02 |
| | | | | 235/375 |
| 2011/0270751 A1* | 11/2011 | Csinger | .................. | G06F 21/40 |
| | | | | 705/42 |
| 2012/0022969 A1* | 1/2012 | Collas | .................... | G06Q 30/00 |
| | | | | 705/26.41 |
| 2012/0191575 A1* | 7/2012 | Vilke | .................. | G06Q 30/0641 |
| | | | | 705/27.1 |
| 2013/0124422 A1* | 5/2013 | Hubert | ............... | G06Q 20/3827 |
| | | | | 705/71 |
| 2013/0173482 A1* | 7/2013 | Twining | ................ | H04L 9/3247 |
| | | | | 705/310 |
| 2013/0191286 A1 | 7/2013 | Cronic et al. | | |
| 2013/0191289 A1* | 7/2013 | Cronic | ............... | G06Q 20/4014 |
| | | | | 705/67 |
| 2013/0304642 A1* | 11/2013 | Campos | ................. | G06Q 20/36 |
| | | | | 705/41 |
| 2013/0304649 A1 | 11/2013 | Cronic et al. | | |
| 2014/0007258 A1 | 1/2014 | Anderson et al. | | |
| 2014/0007259 A1 | 1/2014 | Anderson et al. | | |
| 2014/0025519 A1* | 1/2014 | Thomas | .................... | G06F 8/61 |
| | | | | 705/21 |
| 2014/0101055 A1* | 4/2014 | Grissom | ............... | G06Q 20/027 |
| | | | | 705/71 |
| 2014/0143137 A1* | 5/2014 | Carlson | .................. | G06Q 20/18 |
| | | | | 705/39 |
| 2014/0188586 A1* | 7/2014 | Carpenter | .......... | G06Q 30/0222 |
| | | | | 705/14.23 |
| 2014/0358660 A1* | 12/2014 | Poole | ................. | G06Q 30/0255 |
| | | | | 705/14.25 |
| 2015/0032627 A1* | 1/2015 | Dill | ...................... | G06Q 20/385 |
| | | | | 705/44 |
| 2015/0073992 A1* | 3/2015 | Weiner | .................. | H04W 12/06 |
| | | | | 705/44 |
| 2015/0170141 A1* | 6/2015 | Klingen | ................ | G06F 16/951 |
| | | | | 705/41 |
| 2015/0195311 A1* | 7/2015 | Lemonik | .................. | G06F 9/44 |
| | | | | 715/753 |
| 2016/0134633 A1* | 5/2016 | Gaddam | ................ | G06Q 50/01 |
| | | | | 726/4 |

OTHER PUBLICATIONS

Asmaa H.Rashid, Prof.dr. Abd-Fatth Hegazy; "Protect Privacy of Medical Informatics using K-Anonymization Model"; file 'Protect_Privacy_of_Medical_Informatics_03-01-2010.pdf' (Year: 2010).*

* cited by examiner

US 11,030,587 B2

SYSTEMS AND METHODS FOR PROVIDING ANONYMIZED TRANSACTION DATA TO THIRD-PARTIES

BACKGROUND OF THE DISCLOSURE

The field of the disclosure relates generally to anonymized transaction data, and more particularly, to systems and methods for securely providing anonymized transaction data to third-parties.

In at least some cardholder-initiated financial transactions, the cardholder (e.g., an entity using a payment card such as a credit card, a debit card, or a prepaid card) may wish to share or otherwise provide transaction data to a third-party. Such third-parties incentivize particular cardholder behaviors. Accordingly, many third-parties may receive transaction data and provide the cardholders with third-party services or "value-added services" when the cardholder has participated in a behavior that the third-party wants to incentivize. Value-added services may include benefits, rewards, or other services provided to cardholders based at least in part upon the received transaction data. For example, some third-parties may provide value-added services based upon a cardholder purchasing particular products or purchasing goods or services from specific vendors. Other value-added services may include financial services for tracking and managing spending.

Known methods of providing such transaction data to third-parties may include security and privacy risks. For example, at least some known third-parties are not compliant with standards of the payment card industry ("PCI") and may not store information or transfer information using PCI-compliant methods. Accordingly, methods of providing transaction data to third-parties while reducing or mitigating security and privacy risks are desirable.

BRIEF DESCRIPTION OF THE DISCLOSURE

In one aspect, a computer-implemented method for authorizing access to transaction data to a third-party computer system is provided. The method is implemented by a payment processor computer system coupled to a memory. The method includes receiving a request for access to transaction data associated with a cardholder account, requesting a set of authentication information associated with the cardholder account, authenticating the set of authentication information upon receiving the set of authentication information, and authorizing the third-party computer system to receive transaction data associated with the cardholder account.

In another aspect, a payment processor computer system for authorizing access to transaction data to a third-party computer system is provided. The payment processor computer system includes a processor, and a memory coupled to the processor. The payment processor computer system is configured to receive a request for access to transaction data associated with a cardholder account, request a set of authentication information associated with the cardholder account, authenticate the set of authentication information upon receiving the set of authentication information, and authorize the third-party computer system to receive transaction data associated with the cardholder account.

In a further aspect, computer-readable storage media for authorizing access to transaction data to a third-party computer system is provided. The computer-readable storage media has computer-executable instructions embodied thereon. When executed by at least one processor, the computer-executable instructions cause the processor to receive a request for access to transaction data associated with a cardholder account, request a set of authentication information associated with the cardholder account, authenticate the set of authentication information upon receiving the set of authentication information, and authorize the third-party computer system to receive transaction data associated with the cardholder account.

BRIEF DESCRIPTION OF THE DRAWINGS

The figures listed below show example embodiments of the methods and systems described herein.

FIG. 1 is a schematic diagram illustrating an example multi-party payment card industry system for enabling ordinary payment-by-card transactions in which merchants and card issuers do not necessarily have a one-to-one relationship.

FIG. 2 is a simplified block diagram of an example system including a payment processor computer system used to authorize access to anonymized transaction data to a third-party computer system in accordance with one example embodiment of the present disclosure.

FIG. 3 illustrates an example configuration of a client system shown in FIG. 2.

FIG. 4 illustrates an example configuration of a server system shown in FIG. 2.

FIG. 5 is a simplified data flow diagram showing a payment processor computer system authorizing access to anonymized transaction data to a third-party computer system.

FIG. 6 is a simplified diagram of an example method of authorizing access to anonymized transaction data to a third-party computer system using the payment processor computer system of FIG. 2.

FIG. 7 is a diagram of components of one or more example computing devices that may be used in the environment shown in FIG. 5.

Figure 1:
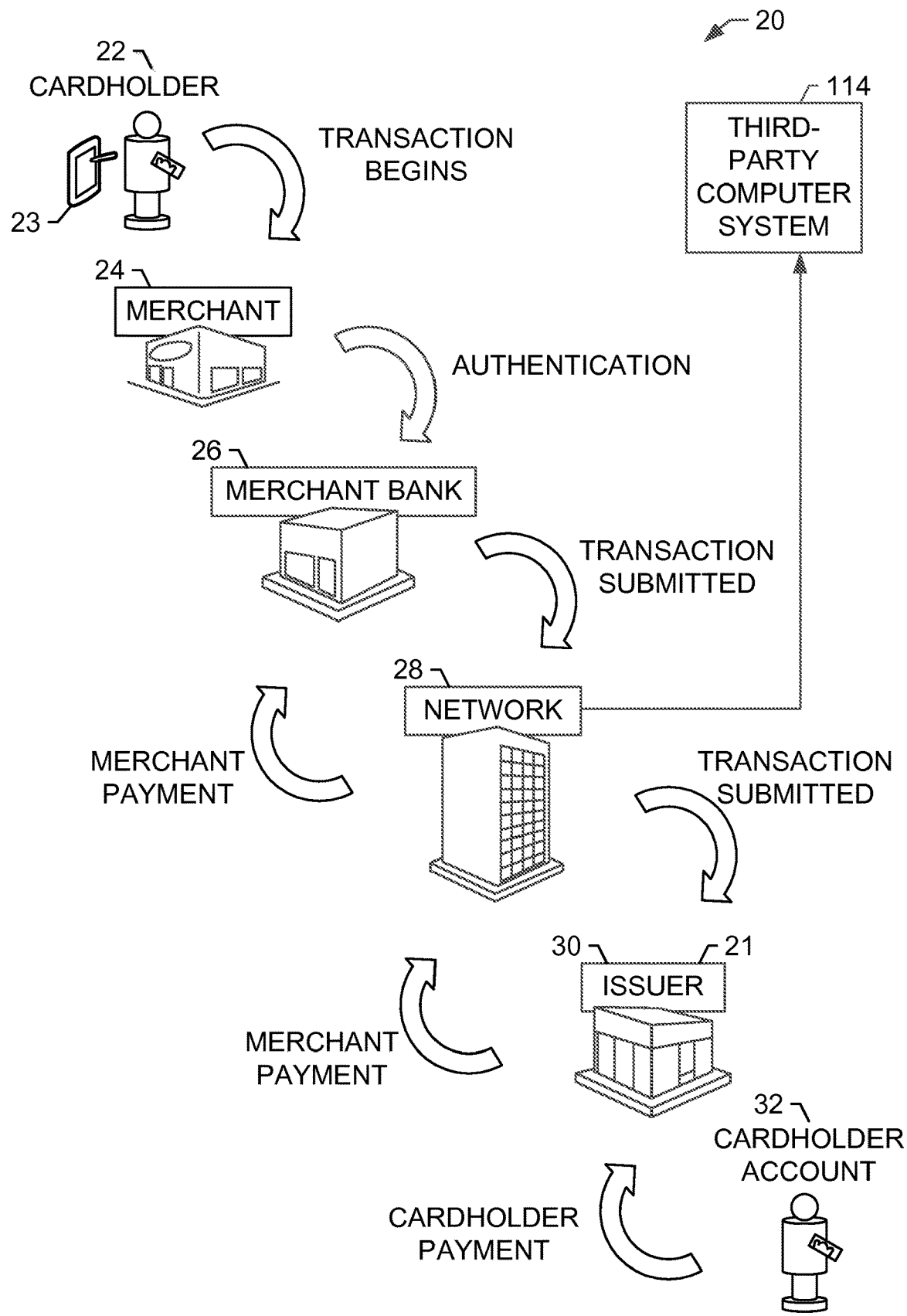
FIGS. 1-7 show example embodiments of the methods and systems described herein.

Although specific features of various embodiments may be shown in some drawings and not in others, this is for convenience only. Any feature of any drawing may be referenced and/or claimed in combination with any feature of any other drawing.

DETAILED DESCRIPTION OF THE DISCLOSURE

The following detailed description of the embodiments of the disclosure refers to the accompanying drawings. The same reference numbers in different drawings may identify the same or similar elements. Also, the following detailed description does not limit the claims.

Described herein are computer systems such as third-party computer systems and payment processor computer systems. As described herein, all such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

The subject matter described herein relates generally to providing anonymized transaction data associated with cardholder payment transactions to third-parties. As described herein, the term "third-parties" refers to entities that are not directly related to cardholder transactions. Accordingly, third-parties may be any entity that is not directly sending, receiving, processing, or storing transaction data during a cardholder transaction. Third-parties are, in other words, entities other than merchants, merchant banks, acquirer banks, issuer banks, and payment networks (i.e., payment processors). As described below, third-parties may use transaction data to provide additional benefits and services to entities associated with cardholder transactions and particularly to cardholders. Such benefits and services may be referred to as "value-added services." Value-added services are provided when a cardholder has participated in a behavior that the third-party wants to incentivize. Third-parties may be associated with computer systems ("third-party computer systems" or "third-party systems") and may receive anonymized transaction data at or via such third-party computer systems.

Also, as described herein, "anonymized transaction data" refers to transaction data that does not directly identify a cardholder. More specifically, anonymized transaction data does not include cardholder account identifiers such as account numbers, addresses associated with cardholder accounts, personal identification numbers ("PIN numbers") associated with cardholder accounts, and names or identifiers associated with the cardholder account. As described herein, standards of the Payment Card Industry ("PCI") require that transaction data not be stored, sent, or received outside of a transaction network with such identifiers as these identifiers may compromise the privacy and security of the cardholder and the cardholder account.

However, in order to provide value-added services, third-parties must be able to identify accounts within their own systems that are associated with particular transaction data. Such accounts may be referred to as "third-party accounts." Accordingly, although anonymized transaction data does not include any identifiers for the cardholder accounts, anonymized transaction data includes identifiers for third-party accounts. As described herein, transaction data is accordingly provided as anonymous in the sense that it does not include cardholder account identifiers while transaction data is provided with unique identifiers associated with third-party accounts.

Third-party computer systems accessing anonymized transaction data are authorized, by a payment processor computer system, to access and receive anonymized transaction data for a particular cardholder. The third-party computer systems are authorized to access and receive anonymized transaction data by a payment processor computer system. The methods and systems described herein facilitate such authorization and access. Specifically, the methods and systems described herein include (i) receiving a request for access to anonymized transaction data associated with a cardholder account, (ii) requesting a set of authentication information associated with the cardholder account, (iii) authenticating the set of authentication information upon receiving the set of authentication information, and (iv) authorizing the third-party computer system to receive anonymized transaction data associated with the cardholder account.

In at least some cardholder-initiated financial transactions, the cardholder (e.g., an entity using a payment card such as a credit card, a debit card, or a prepaid card) may wish to share or otherwise provide transaction data to a third-party. Cardholders may wish to share such transaction data in order to participate in programs created by the third-party. Some third-parties incentivize particular cardholder behavior and provide cardholders with value-added services in the form of benefits when such cardholder behavior has occurred. Other third-parties may provide value-added services such as financial analysis services by analyzing cardholder transaction data.

In one example, a third-party assists a merchant in the promotion of sales of a first product. The third-party may determine that at least some cardholders will be more likely to purchase the first product if they can obtain a second product for free upon the purchase of the first product. Accordingly, the third-party provides a second product for free to cardholders when the cardholder purchases the first product. Merchants seeking to promote the sales of the first product may pay the third-party for each free second product that the third-party gives to cardholders. In a second example, a third-party assists a merchant in the promotion of any purchases made from the merchant. Accordingly, the third-party provides value-added services for every individual transaction that the cardholder makes with the merchant. In a third example, a third-party provides a cardholder financial management advice based upon a review of information including transaction data. In all such and similar examples, third-parties require authorization to access transaction data.

Cardholders typically register with a third-party to obtain value-added services such as those described above. In the example embodiment, cardholders access third-party systems and request to register for value-added services. Cardholders may access third-party systems by using online applications for the third-parties, websites for the third-parties, computing devices for the third-parties (e.g., kiosks in shopping malls where a cardholder can register with the third-party), and interacting with representatives for the third-party in person or by other means. As used herein, any point of access used by a cardholder to register or interact with a third-party computer system may be referred to as a "third-party application." As described, a third-party application may include, for example, a website hosted by or associated with the third-party computer system, an online application hosted by or associated with the third-party computer system, and any other application or service hosted by or associated with the third-party computer system.

During registration with the third-party (at the third-party application), the cardholder may provide a first set of information associated with creating a third-party account. For example, the cardholder may provide (or be provided with) a user identifier, a user password, and other credentials associated with a third-party account that the cardholder may use in subsequent interaction with the third-party. The first set of information resultantly serves to form a unique identifier for the third-party account. Note that the first set of information does not include identifiers for the cardholder account, itself. In the example embodiment, the cardholder provides or receives such third-party account information during interaction with the third-party application.

As described above and herein, in order for the third-party (and any third-party computer systems) to provide at least some value-added services, the third-party requires access to transaction data associated with the cardholder. Accordingly, the third-party computer system (or the third-party application hosted by the third-party computer system) transmits a request to a payment processor computer system associated with the cardholder account. In order to transmit the request, the third-party computer system may first identify an appropriate payment processor computer system. In one example, the cardholder initially accesses the third-party computer system via a third-party application that is specific to a particular payment network associated with the cardholder account. In this example, the appropriate payment processor computer system is inherently identified within the third-party application. In a second example, the cardholder accesses the third-party computer system via a third-party application, provides the first set of information, and designates a particular payment network as associated with the cardholder account. In this example, the third-party computer system transmits a request to the payment processor computer system designated by the cardholder.

In order to provide anonymized transaction data using the methods described herein, the payment processor computer system associates the third-party account with the cardholder account. Accordingly, the third-party computer system transmits a secure identifier associated with the third-party account. The secure identifier may include at least a portion of the first set of information received from the cardholder. The secure identifier does not contain any information that may directly identify the cardholder account. Further, the secure identifier does not contain any information directly identifying the cardholder associated with the cardholder account. In the example embodiment, the secure identifier does not include, for example, the primary account number (PAN) associated with the cardholder account, the personal identification number (PIN) associated with the cardholder account, or any personally identifiable information (PII) associated with the cardholder. In at least one embodiment, the secure identifier represents an alphanumeric string that does not directly identify the cardholder account or the third-party account. The alphanumeric string (or secure identifier) is a unique identifier that is associated, at the third-party computer system, with the third-party account.

In at least some examples, the secure identifier is specifically associated with a particular third-party application or a third-party computer system. For example, secure identifiers may be generated according to a unique format or layout depending upon the associated third-party application or third-party computer system.

The payment processor computer system receives the secure identifier with the request for access to anonymized transaction data associated with the cardholder account. In response, in one embodiment, the payment processor computer system generates a secure authentication mechanism and provides the secure authentication mechanism to the third-party computer system. The secure authentication mechanism represents a means of receiving cardholder account information at the payment processor computer system from a cardholder interacting with a third-party application while the received cardholder account information bypasses the third-party application and the third-party computer system. In operation, the secure authentication mechanism creates and/or uses a secure channel to transmit the received cardholder account information directly to the payment processor computer system and bypassing any direct interaction with the third-party computer system.

In one embodiment, the secure authentication mechanism represents an embedded frame that is presented within the third-party application as an "authentication screen". The embedded frame may be represented as a request form. The secure authentication mechanism is configured to request authentication information and to receive authentication information from a cardholder. The authentication information allows the payment processor computer system to authenticate the cardholder as validly associated with a valid cardholder account.

The secure authentication mechanism, or embedded frame, is served to the third-party computer system such that the secure authentication mechanism is served to the cardholder as though it is integrated with the third-party application. In fact, the secure authentication mechanism is associated with the payment processor computer system and the cardholder is exclusively interacting with the payment processor computer system when interacting with the embedded frame. Accordingly, PCI compliance is enhanced by reduced availability of cardholder information to third-parties.

When a cardholder enters authentication information into the secure authentication mechanism or, more specifically, into the embedded frame, the entered authentication information is submitted to the payment processor computer system. Accordingly, the payment processor computer system receives authentication information. The authentication information includes any information that the payment processor computer system may use to authenticate the cardholder as validly associated with the cardholder account. As such, the authentication information may include, without limitation, a primary account number associated with the cardholder account, a personal or business name associated with the cardholder account, a personal identification number (PIN) number associated with the cardholder account, an expiration date associated with the cardholder account, a security phrase or passcode, and a physical address associated with the cardholder account.

The payment processor computer system authenticates the authentication information. In other words, the payment processor computer system verifies that the authentication information is consistent and associated with a valid cardholder account. Such authentication may include any known methods including, for example, checksum algorithms to validate a PAN as a valid PAN, and retrieval of cardholder account information from a database, and comparison to authentication information.

Upon authentication and/or validation, the payment processor computer system associates the secure identifier with the cardholder account associated with the authentication information. In at least one embodiment, the payment processor computer system creates a record associating a PAN associated with the authentication information and the secure identifier. Accordingly, a relationship between the secure identifier and the cardholder account is created and may be used to access anonymized transaction data associated with the cardholder account for the cardholder registering at the third-party application.

Further, in embodiments where the secure identifier is uniquely associated with a particular third-party application or third-party computer system, the payment processor computer system identifies that the secure identifier is associated as such. Accordingly, the payment processor computer system includes additional information associating the PAN and the secure identifier with a particular third-party application identifier or a third-party computer system identifier. As discussed herein, certain third-party applications and third-party computer systems may receive anonymized transaction data in distinct manners. Accordingly, distinguishing between the third-party applications or third-party computer systems allows the payment processor computer system to provide anonymized transaction data more discretely.

Upon authentication and/or validation of the authentication information, the payment processor computer system authorizes the third-party computer system to receive anonymized transaction data associated with the cardholder account. Authorizing the third-party computer system includes any appropriate means for indicating that anonymized transaction data associated with the cardholder account may be provided to the third-party computer system. In one example, the payment processor computer system sets an indicator flag to indicate that anonymized transaction data associated with the authorized cardholder account may be sent to a third-party computer system.

In a second example, the payment processor computer system generates an authorization token associated with the cardholder account. The authorization token is similarly associated in a record with the PAN and the secure identifier. The authorization token may be provided, as described below, by a third-party computer system or third-party application to indicate that the cardholder account has been previously authorized. The authorization token may be stored at the third-party computer system, a computer system associated with the cardholder, or any other suitable location.

In a third example, the payment processor computer system generates and transmits a confirmation message to the third-party computer system. The confirmation message indicates that the third-party computer system is authorized to receive anonymized transaction data associated with the cardholder account. In at least some examples, the confirmation message is displayed to the cardholder using the secure authentication mechanism, a second mechanism (such as a different embedded frame), or an alert.

Upon authorization, anonymized transaction data associated with the cardholder account may be transmitted from the payment processor computer system to a third-party computer system. In one example, the third-party computer system transmits a request for anonymized transaction data. The request for anonymized transaction data includes the secure identifier. In at least some examples, the request for anonymized transaction data also includes the authorization token as an indication that the request for access to anonymized transaction data has been previously authorized. In additional examples, the request for anonymized transaction data may include limiters for a range of time, a category of purchases, a list of merchants, and a transaction value limit. In other words, the request for anonymized transaction data may be constrained to a particular time period, a category of purchases, a list of merchants, and a transaction value limit.

Accordingly, the payment processor computer system receives the request for anonymized transaction data associated with the cardholder. The payment processor computer system processes the request by identifying a primary account identifier (for example, a PAN) associated with the request. In at least one example, the payment processor computer system identifies the secure identifier within the request for anonymized transaction data, retrieves a record including a reference corresponding to the secure identifier, and identifies a cardholder account associated with the secure identifier.

The payment processor computer system retrieves anonymized transaction data relevant to the request. In at least some examples, relevant transaction data is anonymized transaction data responsive to limiters as described above including a range of time, a category of purchases, a list of merchants, and a transaction value limit.

The payment processor computer system anonymizes the transaction data by removing all references to information that may directly identify the cardholder account or the cardholder. Accordingly, the payment processor computer system removes, masks, scrambles, or otherwise protects data including a primary account number (PAN), cardholder personally identifiable information (PII), personal identification numbers (PIN), and any other data that may directly identify the cardholder account or the cardholder. The anonymized transaction data is tagged or associated with the secure identifier and sent back to the third-party computer system. Accordingly, the third-party computer system may associate the retrieved anonymized transaction data with a particular third-party account and provide value-added services such as those described above and herein.

Described in detail herein are example embodiments of systems and methods for authorizing access to anonymized transaction data to a third-party computer system. The systems and methods facilitate, for example, receiving a request for access to transaction data associated with a cardholder account, requesting a set of authentication information associated with the cardholder account, authenticating the set of authentication information upon receiving the set of authentication information, and authorizing the third-party computer system to receive transaction data associated with the cardholder account.

A technical effect of the systems and methods described herein include at least one of (a) facilitating third-party services based at least in part on transaction data; (b) mitigating privacy risk and security risk associated with sharing transaction data with a third-party; and (c) mitigating privacy risk and security risk associated with non-anonymized transaction data received at or stored at a third-party computer system.

More specifically, the technical effects can be achieved by performing at least one of the following steps: (a) receiving, at the payment processor computer system, a request for access to transaction data associated with a cardholder account from a third-party computer system; (b) requesting a set of authentication information associated with the cardholder account; (c) authenticating, at the payment processor computer system, the set of authentication information upon receiving the set of authentication information; (d) authorizing the third-party computer system to receive transaction data associated with the cardholder account; (e) generating an authorization token associated with the cardholder account and transmitting the authorization token to the third-party computer system; (f) receiving a secure identifier associated with the cardholder account, wherein the secure identifier does not contain any information directly identifying the cardholder account and does not contain any information directly identifying a cardholder associated with the cardholder account, the primary account identifier directly identifying the cardholder account in the payment processor computer system; (g) associating, at the payment processor computer system, the secure identifier with a primary account identifier for the cardholder account; (h) receiving a request for transaction data from the third-party computer system, wherein the request for transaction data includes the secure identifier; (i) retrieving the primary account identifier based upon the secure identifier; (j) retrieving transaction data associated with the cardholder account based upon the primary account identifier; (k) providing transaction data associated with the cardholder account to the third-party computer system, wherein the transaction data is provided using the secure identifier and contains no personally identifiable information (PII); (l) receiving an identifier associated with at least one of third-party software associated with the third-party computer system and the third-party computer system; (m) generating a request form configured to transmit the set of authentication information directly to the payment processor computer system, and providing the request form to the third-party computer system, wherein the request form is embedded within third-party software configured to be executed on the third-party computer system; (n) providing a confirmation message to the third-party computer system upon authorizing the third-party computer system to receive transaction data associated with the cardholder account; and (o) receiving at least one of a primary account number associated with the cardholder account, a personal name associated with the cardholder account, a personal identification number (PIN) number associated with the cardholder account, and a physical address associated with the cardholder account.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transactions card can be used as a method of payment for performing a transaction. In addition, consumer card account behavior can include but is not limited to purchases, management activities (e.g., balance checking), bill payments, achievement of targets (meeting account balance goals, paying bills on time), and/or product registrations (e.g., mobile application downloads).

The systems and processes are not limited to the specific embodiments described herein. In addition, components of each system and each process can be practiced independent and separate from other components and processes described herein. Each component and process also can be used in combination with other assembly packages and processes.

The following detailed description illustrates embodiments of the disclosure by way of example and not by way of limitation. It is contemplated that the disclosure has general application to the determination and analysis of characteristics of devices used in payment transactions.

FIG. 1 is a schematic diagram illustrating an example multi-party transaction card industry system 20 for enabling ordinary payment-by-card transactions in which merchants 24 and card issuers 30 do not need to have a one-to-one special relationship. Typical financial transaction institutions provide a suite of interactive, online applications to both current and prospective customers. For example, a financial transactions institution may have a set of applications that provide informational and sales information on their products and services to prospective customers, as well as another set of applications that provide account access for existing cardholders.

Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.).

In a typical transaction card system, a financial institution called the "issuer" issues a transaction card, such as a credit card, to a consumer or cardholder 22, who uses the transaction card to tender payment for a purchase from a merchant 24. To accept payment with the transaction card, merchant 24 must normally establish an account with a financial institution that is part of the financial payment system. This financial institution is usually called the "merchant bank," the "acquiring bank," or the "acquirer." When cardholder 22 tenders payment for a purchase with a transaction card or virtual transaction card, merchant 24 requests authorization from a merchant bank 26 for the amount of the purchase. The request may be performed over the telephone or electronically, but is usually performed through the use of a point-of-sale terminal, which reads cardholder's 22 account information from a magnetic stripe, a chip, or embossed characters on the transaction card and communicates electronically with the transaction processing computers of merchant bank 26. Alternatively, merchant bank 26 may authorize a third-party to perform transaction processing on its behalf. In this case, the point-of-sale terminal will be configured to communicate with the third-party. Such a third-party is usually called a "merchant processor," an "acquiring processor," or a "third-party processor."

Using an interchange network 28, computers of merchant bank 26 or merchant processor will communicate with computers of an issuer bank 30 to determine whether cardholder's 22 account 32 is in good standing and whether the purchase is covered by cardholder's 22 available credit line. Based on these determinations, the request for authorization will be declined or accepted. If the request is accepted, an authorization code is issued to merchant 24.

When a request for authorization is accepted, the available credit line of cardholder's 22 account 32 is decreased. Normally, a charge for a payment card transaction is not posted immediately to cardholder's 22 account 32 because bankcard associations, such as MasterCard International Incorporated®, have promulgated rules that do not allow merchant 24 to charge, or "capture," a transaction until products are shipped or services are delivered. However, with respect to at least some debit card transactions, a charge may be posted at the time of the transaction. When merchant 24 ships or delivers the products or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns products after the transaction has been captured, a "credit" is generated. Interchange network 28 and/or issuer bank 30 stores the transaction card information, such as a type of merchant, amount of purchase, date of purchase, in a database 120 (shown in FIG. 2).

After a purchase has been made, a clearing process occurs to transfer additional transaction data related to the purchase among the parties to the transaction, such as merchant bank 26, interchange network 28, and issuer bank 30. More specifically, during and/or after the clearing process, additional data, such as a time of purchase, a merchant name, a type of merchant, purchase information, cardholder account information, a type of transaction, information regarding the purchased item and/or service, and/or other suitable information, is associated with a transaction and transmitted between parties to the transaction as transaction data, and may be stored by any of the parties to the transaction. As described herein, in at least some examples a cardholder 22 may approve a third-party computer system 114 to receive anonymized transaction data after third-party computer system 114 is authorized to receive such anonymized transaction data. As described herein, "anonymized transaction data" represents transaction data that has information that may be used to directly identify a cardholder account or cardholder 22 removed from its records.

After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction is typically settled between issuer bank 30 and interchange network 28, and then between interchange network 28 and merchant bank 26, and then between merchant bank 26 and merchant 24.

As described below in more detail, payment processor computer system 112 (shown in FIG. 2) may be used to authorize access to anonymized transaction data to a third-party computer system. Although the systems described herein are not intended to be limited to facilitate such applications, the systems are described as such for exemplary purposes.

Figure 2:
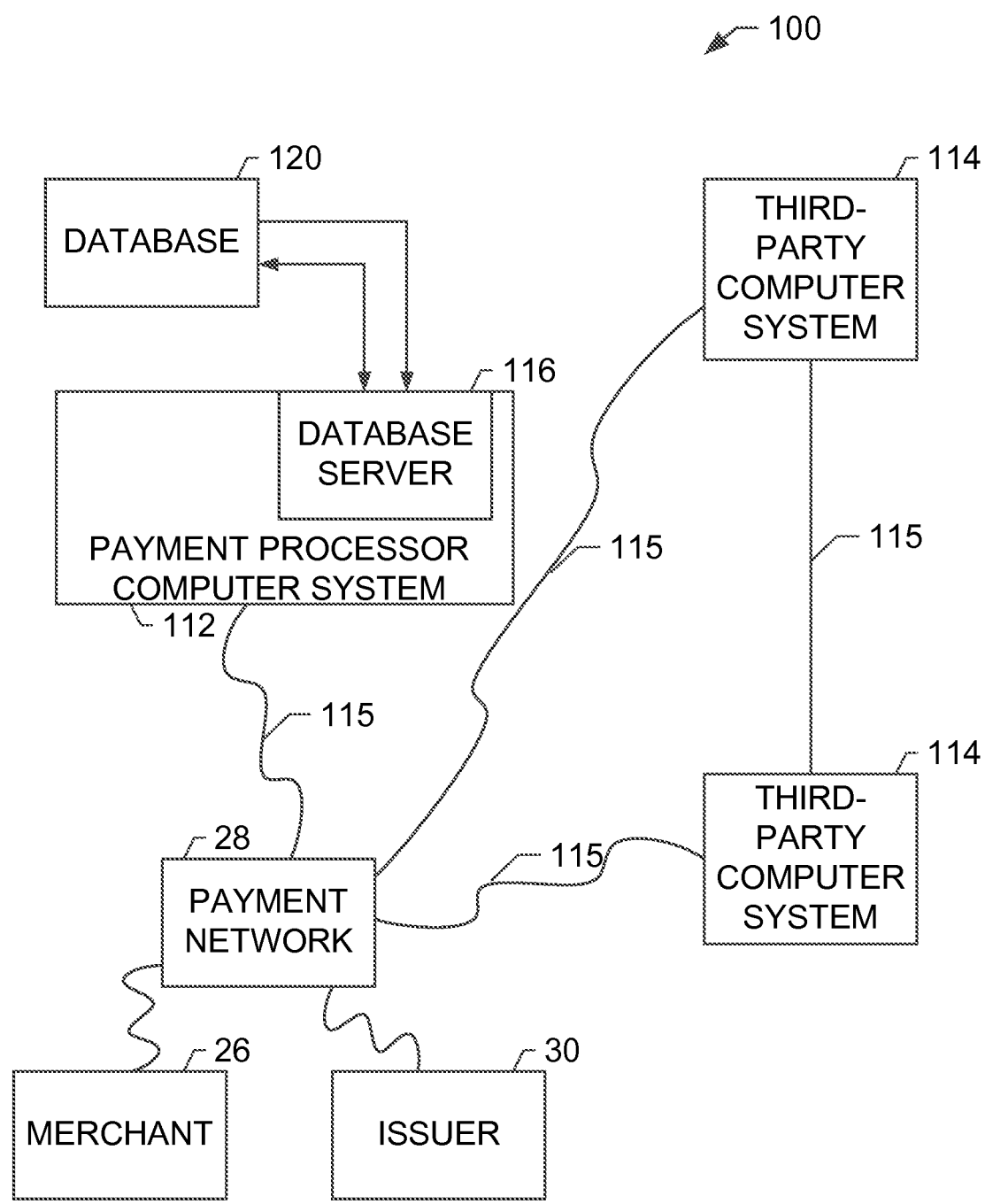

FIG. 2 is a simplified block diagram of an example computer system 100 including a payment processor computer system 112 used to authorize access to anonymized transaction data to a third-party computer system 114 in accordance with one example embodiment of the present disclosure. In the example embodiment, system 100 is used for receiving a request for access to anonymized transaction data associated with a cardholder account, requesting a set of authentication information associated with the cardholder account, authenticating the set of authentication information upon receiving the set of authentication information, and authorizing the third-party computer system to receive anonymized transaction data associated with the cardholder account, as described herein. In other embodiments, the applications may reside on other computing devices (not shown) communicatively coupled to system 100, and may be used to authorize access to anonymized transaction data to third-parties and to further provide anonymized transaction data to third-parties, using system 100.

More specifically, in the example embodiment, system 100 includes a payment processor computer system 112, and a plurality of client sub-systems, also referred to as third-party computer systems 114, connected to payment processor computer system 112. In one embodiment, third-party computer systems 114 are computers including a web browser, such that payment processor computer system 112 is accessible to third-party computer systems 114 using payment network 28 and network 115 (such as the Internet). In some examples, not shown, payment processor computer system 112 is directly accessible to third-party computer systems using network 115. Payment processor computer systems 112 are interconnected to the Internet through many interfaces including a network 115, such as a local area network (LAN) or a wide area network (WAN), dial-in-connections, cable modems, special high-speed Integrated Services Digital Network (ISDN) lines, and RDT networks. Payment processor computer system 112 is also in communication with payment network 28 using network 115. Third-party computer systems 114 may additionally communicate with payment network 28 using network 115. Payment network 28 is further connected to merchant bank 26 and issuer bank 30. Third-party computer systems 114 could be any device capable of interconnecting to the Internet including a web-based phone, PDA, or other web-based connectable equipment.

A database server 116 is connected to database 120, which contains information on a variety of matters, as described below in greater detail. In one embodiment, centralized database 120 is stored on payment processor computer system 112 and can be accessed by potential users at one of third-party computer systems 114 by logging onto payment processor computer system 112 through one of third-party computer systems 114. In an alternative embodiment, database 120 is stored remotely from payment processor computer system 112 and may be non-centralized.

Database 120 may include a single database having separated sections or partitions, or may include multiple databases, each being separate from each other. Database 120 may store transaction data generated over the processing network including data relating to merchants, account holders, prospective customers, issuers, acquirers, and/or purchases made. Database 120 may also store account data including at least one of a cardholder name, a cardholder address, an account number, other account identifiers, and transaction information. Database 120 may also store merchant data including a merchant identifier that identifies each merchant registered to use the network, and instructions for settling transactions including merchant bank account information. Database 120 may also store purchase data associated with items being purchased by a cardholder from a merchant, and authorization request data. In the example embodiment, database 120 additionally stores data related to the authorization of third-party computer systems 114 to access anonymized transaction data associated with cardholder accounts. More specifically, this data includes records associating secure identifiers with cardholder accounts, authorization tokens with cardholder accounts, secure identifiers with particular third-parties, and formats and standards associated with the anonymizing of transaction data for particular third-parties and cardholder accounts.

In one embodiment, one of third-party computer systems 114 may be associated with a first third-party (not shown) while another one of third-party computer systems 114 may be associated with a second third-party (not shown). Payment processor computer system 112 may be associated with interchange network 28. In the example embodiment, payment processor computer system 112 is associated with a network interchange or a payment processor, such as interchange network 28, and may be referred to as an interchange computer system. Payment processor computer system 112 may be used for processing transaction data. In addition, third-party computer systems 114 may include a computer system associated with at least one of an online bank, a bill payment outsourcer, an acquirer bank, an acquirer processor, an issuer bank associated with a transaction card, an issuer processor, a remote payment system, customers and/or billers. As used herein, a cardholder 22 (shown in FIG. 1) accesses third-party computer system 114 via, for example, the Internet, and requests that a cardholder account be authorized to provide anonymized transaction data to third-party computer system 114. Third-party computer system 114 transmits a request for access to transaction data to payment processor computer system 112. Payment processor computer system 112 requests authentication information from cardholder 22 via third-party computer system 114 and authenticates the received authentication information. Upon authentication, payment processor computer system 112 authorizes third-party computer system 114 to receive transaction data associated with a cardholder account associated with cardholder 22. As described herein, third-party computer system 114 may accordingly request transaction data associated with the cardholder account and receive such transaction data in an anonymized form.

Figure 3:
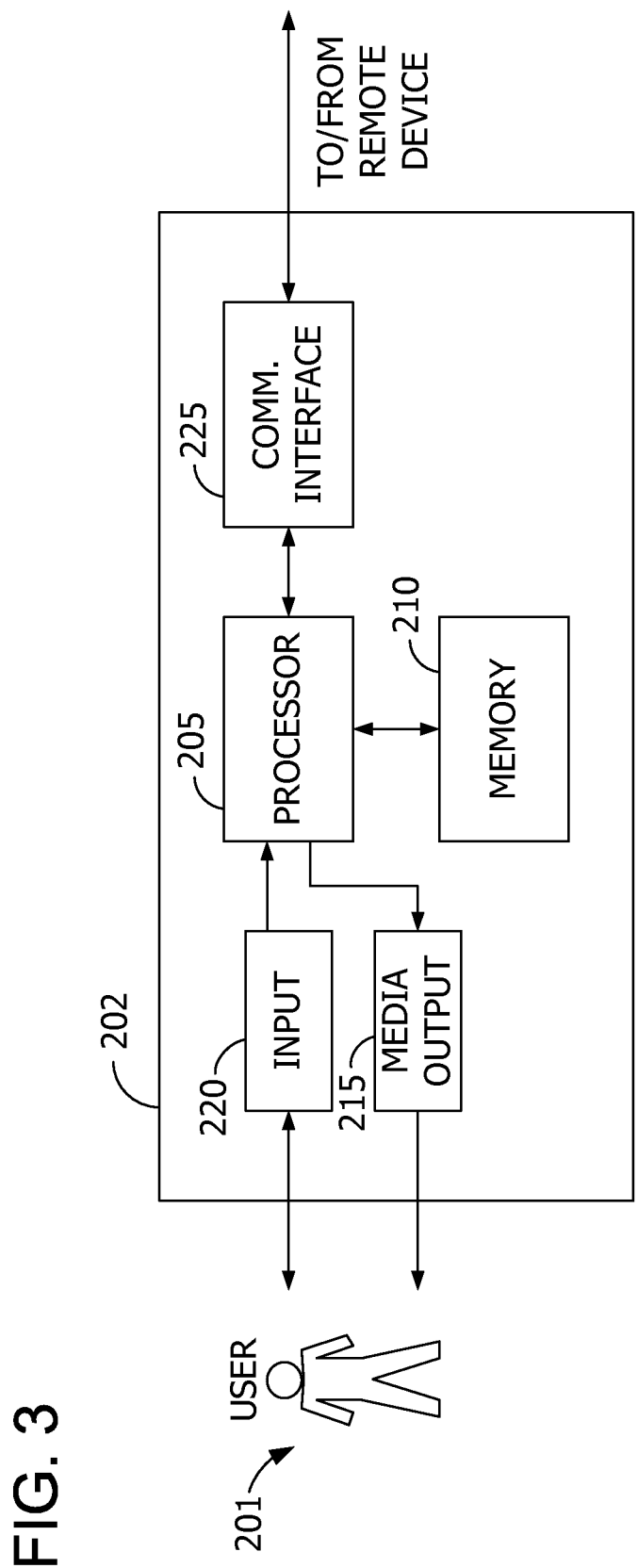

FIG. 3 illustrates an example configuration of a user system 202, such as cardholder computing device 23 (shown in FIG. 1) operated by a user 201, such as cardholder 22 (shown in FIG. 1). User system 202 may include, but is not limited to, cardholder computing device 23, client systems 117, 138, 140, and 142, payment systems 118, workstation 154, and manager workstation 156. In the example embodiment, user system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer readable media.

User system 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively couplable to a remote device such as payment processor computer system 112 and/or third-party computer system 114 (shown in FIG. 2). Communication interface 225 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from third-party computer system 114. A client application allows user 201 to interact with a server application from third-party computer system 114.

Figure 4:
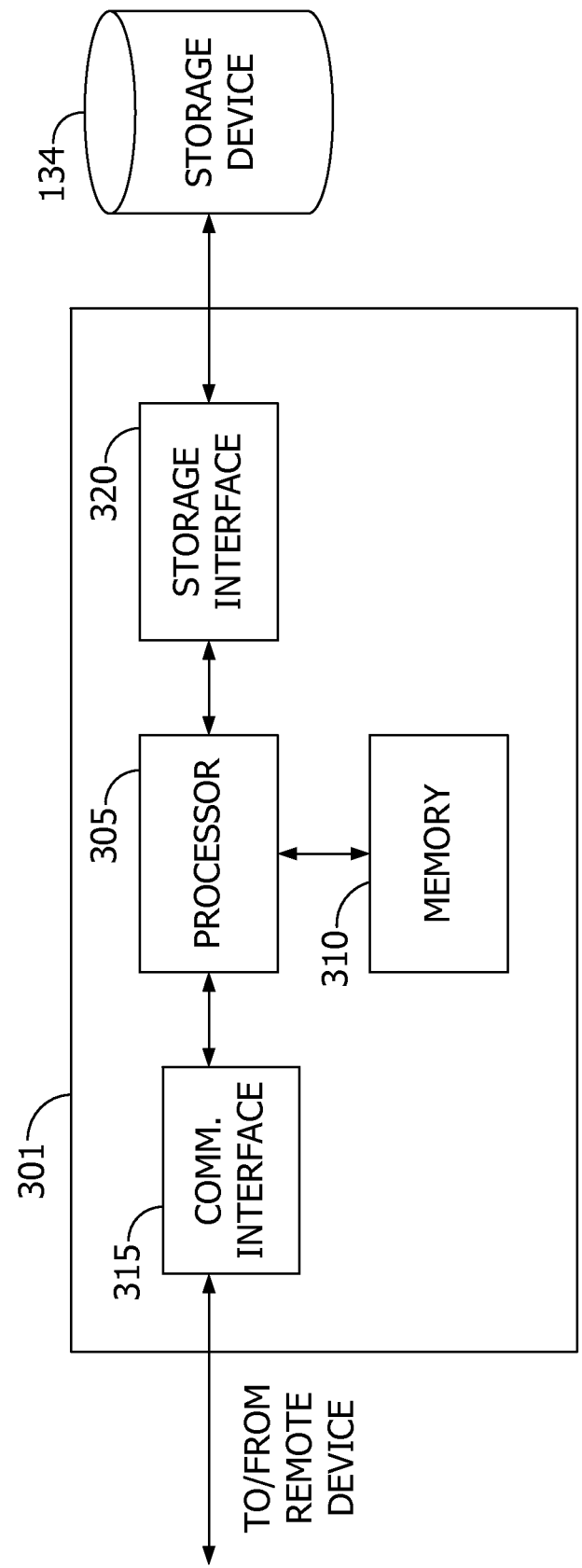

FIG. 4 illustrates an example configuration of a server system 301 such as payment processor computer system 112 and third-party computer system 114 (both shown in FIG. 2). Server system 301 may include, but is not limited to, database server 116, transaction server 124, web server 126, user authentication server 128, directory server 130, and mail server 132. In the example embodiment, server system 301 authorizes a third-party computer system to receive anonymized transaction data, as described below.

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 315 such that server system 301 is capable of communicating with a remote device such as a user system or another server system 301. For example, communication interface 315 may receive requests from third-party computer system 114 via the Internet, as illustrated in FIG. 2.

Processor 305 may also be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 5:
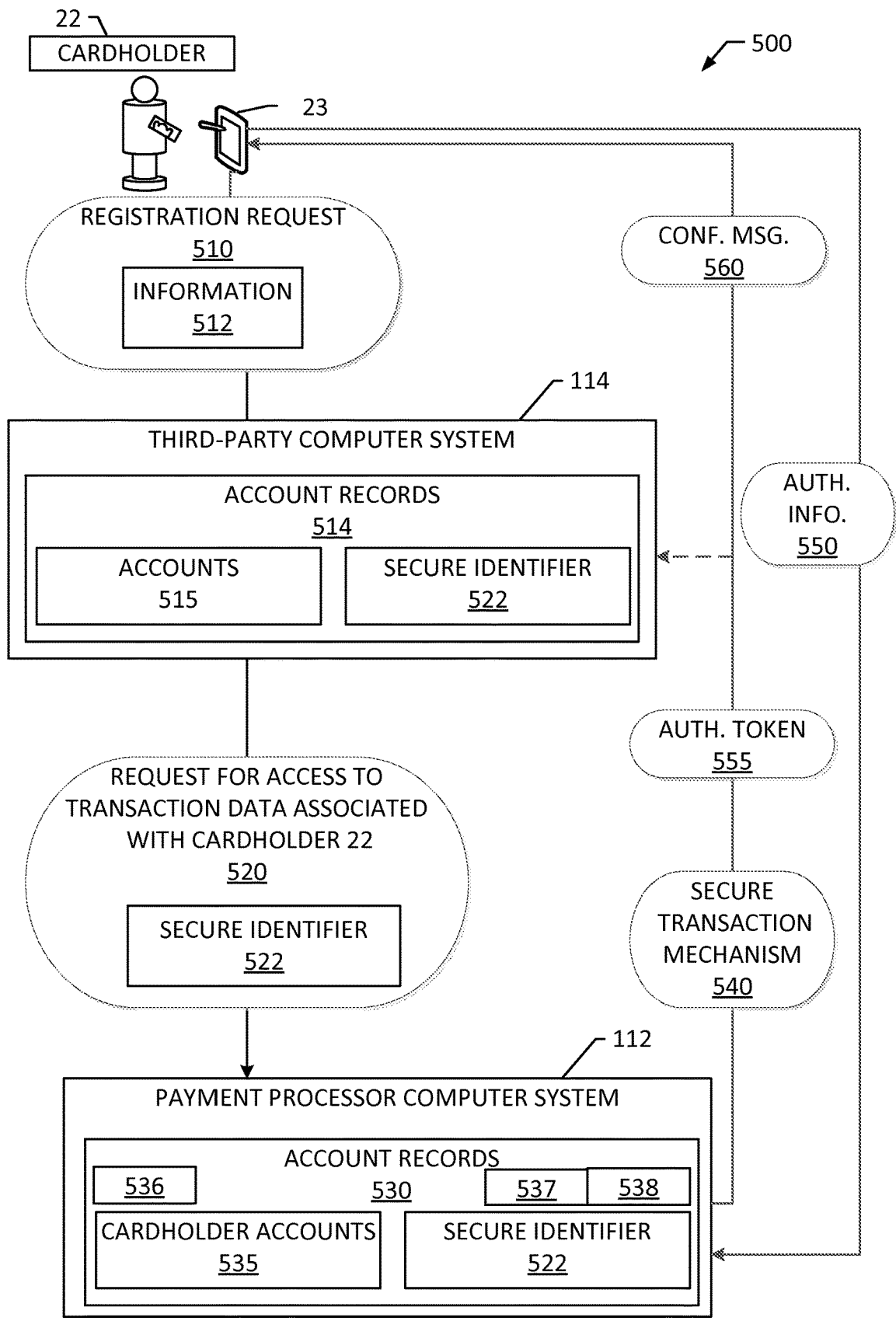

FIG. 5 is a simplified data flow diagram 500 showing a payment processor computer system 112 authorizing access to anonymized transaction data to a third-party computer system 114.

In at least some cardholder-initiated financial transactions, cardholder 22 (e.g., an entity using a payment card such as a credit card, a debit card, or a prepaid card) may wish to share or otherwise provide transaction data to a third-party computer system 114 associated with a third-party. Cardholders 22 may wish to share such transaction data in order to participate in programs created by a third-party. Some third-parties incentivize particular cardholder behavior and provide cardholders 22 with value-added services in the form of benefits when such cardholder behavior has occurred. Other third-parties may provide value-added services such as financial analysis services by analyzing cardholder transaction data. In this example, cardholder 22 is associated with cardholder account 535.

Cardholders 22 typically register with a third-party to obtain value-added services such as those described above. In the example embodiment, cardholders 22 access third-party computer systems 114 and request to register for value-added services. Cardholders 22 may access third-party computer systems 114 by using online applications for the third-parties, websites for the third-parties, computing devices for the third-parties, and interacting with representatives for the third-party in person or by other means. As used herein, any point of access used by a cardholder 22 to register or interact with a third-party computer system may be referred to as a "third-party application." As described, a third-party application may include, for example, a website hosted by or associated with third-party computer system 114, an online application hosted by or associated with third-party computer system 114, and any other application or service hosted by or associated with third-party computer system 114.

During registration with third-party computer system 114, cardholder 22 transmits a registration request 510 including a first set of information 512 associated with creating a third-party account 515. For example, cardholder 22 may create a user identifier, a user password, and other credentials associated with third-party account 515 that cardholder 22 may use in subsequent interaction with third-party computer system 114. In other examples, cardholder 22 may receive first set of information 512 from third-party computer system 114 after first set of information 512 is automatically generated by third-party computer system 114. First set of information 512 resultantly serves to form a unique identifier for third-party account 515. Note that first set of information 512 does not include identifiers for cardholder account 535, itself. In the example embodiment, the cardholder provides or receives such third-party account information during interaction with the third-party application.

As described above and herein, in order for the third-party (and any third-party computer systems) to provide at least some value-added services, the third-party requires access to transaction data associated with the cardholder. Accordingly, third-party computer system 114 transmits a request 520 for access to transaction data to a payment processor computer system 112 associated with cardholder account 535. In order to transmit request 520, third-party computer system 114 may first identify an appropriate payment processor computer system 112. In one example, cardholder 22 initially accesses the third-party computer system 114 via a third-party application that is specific to a particular payment network 28 (shown in FIG. 1) and, a particular payment processor computer system 112, associated with cardholder account 535. In this example, the appropriate payment processor computer system 112 is inherently identified by the third-party application. In a second example, cardholder 22 accesses third-party computer system 114 via a third-party application, provides first set of information 512, and designates a particular payment network 28 as associated with cardholder account 535. In this example, third-party computer system 114 transmits request 520 to payment processor computer system 112 based upon the payment network 28 designated by cardholder 22.

In order to provide transaction data using the methods described herein, payment processor computer system 112 associates third-party account 515 with cardholder account 535. Accordingly, to facilitate such association, third-party computer system 114 associates a secure identifier 522 with third-party account 515 and transmits secure identifier 522 in request 520. Third-party computer system 114 associates secure identifier with third-party account 515 by writing a record in account records 514 stored in at least one of memory 310 (shown in FIG. 4), storage device 134 (shown in FIG. 4), database server 116, or database 120. Account records 514 accordingly include records relating third-party accounts 515 and secure identifiers 522.

Secure identifier 522 may include at least a portion of first set of information 512 received from cardholder 22. Secure identifier 522 does not contain any information that may directly identify cardholder account 535. Further, secure identifier 522 does not contain any information directly identifying cardholder 22 associated with cardholder account 535. In the example embodiment, secure identifier 522 does not include, for example, the primary account number (PAN) associated with cardholder account 535, the personal identification number (PIN) associated with cardholder account 535, or any personally identifiable information (PII) associated with cardholder 22. In at least one embodiment, secure identifier 522 represents an alphanumeric string that does not directly identify cardholder account 535 or third-party account 515. The alphanumeric string (or secure identifier) is a unique identifier that is associated, at third-party computer system 114, with third-party account 515.

In at least some examples, secure identifier 522 is specifically associated with a particular third-party application or a particular third-party computer system 114. For example, secure identifiers may be generated according to a unique format or layout depending upon the associated third-party application or third-party computer system 114.

Payment processor computer system 112 receives secure identifier 522 with request 520. In response, in one embodiment payment processor computer system 112 generates a secure authentication mechanism 540 and provides secure authentication mechanism 540 to third-party computer system 114. Secure authentication mechanism 540 represents a means of receiving cardholder account information at payment processor computer system 112 from cardholder 22 interacting with a third-party application while the received cardholder account information bypasses the third-party application and third-party computer system 114. In operation, secure authentication mechanism 540 creates and/or uses a secure channel to transmit the received cardholder account information directly to payment processor computer system 112 and bypassing any direct interaction with third-party computer system 114.

In one embodiment, secure authentication mechanism 540 represents an embedded frame that is presented as an "authentication screen" within the third-party application hosted by third-party computer system 114. The embedded frame may be represented as a request form. Secure authentication mechanism 540 is configured to request authentication information 550 and to receive authentication information 550 from cardholder 22. Authentication information 550 allows payment processor computer system 112 to authenticate cardholder 22 as validly associated with valid cardholder account 535.

Secure authentication mechanism 540, or embedded frame, is served to third-party computer system 114 such that secure authentication mechanism 540 is served to cardholder 22 as though it is integrated with the third-party application. In fact, secure authentication mechanism 540 is associated with payment processor computer system 112 and cardholder 22 is exclusively interacting with payment processor computer system 112 when interacting with secure authentication mechanism 540. Accordingly, PCI compliance is enhanced by reduced availability of cardholder information to third-parties.

When cardholder 22 enters authentication information 550 into the embedded frame or, more specifically, into the embedded frame, the entered authentication information 550 is submitted to payment processor computer system 112. Accordingly, payment processor computer system 112 receives authentication information 550. Authentication information 550 includes any information that payment processor computer system 112 may use to authenticate cardholder 22 as validly associated with cardholder account 535. As such, authentication information 550 may include, without limitation, a primary account number associated with cardholder account 535, a personal or business name associated with cardholder account 535, a personal identification number (PIN) number associated with cardholder account 535, an expiration date associated with cardholder account 535, a security phrase or passcode, and a physical address associated with cardholder account 535.

Payment processor computer system 112 authenticates authentication information 550. In other words, payment processor computer system 112 verifies that authentication information 550 is consistent and associated with valid cardholder account 535. Such authentication may include any known methods including, for example, checksum algorithms to validate a PAN as a valid PAN, and retrieval of cardholder account information from a database, and comparison to authentication information 550.

Upon authentication and/or validation, payment processor computer system 112 associates secure identifier 522 with cardholder account 535 associated with authentication information 550. In at least one embodiment, payment processor computer system 112 creates an account record 530 associating cardholder account 535 (or related data such as a PAN) associated with authentication information 550 and secure identifier 522. Accordingly, a relationship between secure identifier 522 and cardholder account 535 is created. Thus, secure identifier 522 may be used to access transaction data associated with cardholder account 535. Payment processor computer system 112 associates secure identifier with cardholder account 535 by writing a record in account records 530 stored in at least one of memory 310 (shown in FIG. 4), storage device 134 (shown in FIG. 4), database server 116, or database 120. Account records 530 accordingly include records relating cardholder accounts 535 and secure identifiers 522.

Further, in embodiments where secure identifier 522 is uniquely associated with a particular third-party application or third-party computer system 114, payment processor computer system 112 identifies that secure identifier 522 is associated as such. Accordingly, payment processor computer system 112 includes additional information 536 associating the PAN and the secure identifier with a particular third-party application identifier or a third-party computer system identifier. As discussed herein, certain third-party applications and third-party computer systems may receive transaction data in distinct manners. Accordingly, distinguishing between the third-party applications or third-party computer systems 114 allows payment processor computer system 112 to provide transaction data more discretely.

Upon authentication and/or validation of authentication information 550, payment processor computer system 112 authorizes third-party computer system 114 to receive transaction data associated with cardholder account 535. Authorizing third-party computer system 114 includes any appropriate means for indicating that transaction data associated with cardholder account 535 may be provided to third-party computer system 114. In one example, payment processor computer system 112 sets an indicator flag 537 to indicate that transaction data associated with the authorized cardholder account 535 may be sent to third-party computer system 114. Indicator flag 537 may identify a particular third-party computer system 114 or may simply indicate that cardholder account 535 is or is not authorized to have transaction data sent to third-party computer system 114.

In a second example, payment processor computer system 112 generates an authorization token 555 associated with cardholder account 535. Authorization token 555 is similarly associated in account record 530 with cardholder account 535, secure identifier 522, and other data 536 and 537. Authorization token 555 is so associated with authorization token indicator 538, written into account record 530. Authorization token indicator 538 identifies a particular authorization token 555 as active and associated with cardholder account 535. Authorization token indicator 538 can assist in situations where authorization token 555 was erroneously provided to the wrong party or associated with the wrong account. Authorization token 555 may be provided, as described below, by third-party computer system 114 or third-party application to indicate that cardholder account 535 has been previously authorized. Authorization token 555 may be stored at third-party computer system 114, cardholder computing device 23, or any other suitable location.

In a third example, payment processor computer system 112 generates and transmits a confirmation message 560 to third-party computer system 114. Confirmation message 560 indicates that third-party computer system 114 is authorized to receive transaction data associated with cardholder account 535. In at least some examples, confirmation message 560 is displayed to cardholder 22 at cardholder computing device 23 using secure authentication mechanism 540, a second mechanism (such as a different embedded frame, not shown), or an alert (not shown).

Upon authorization, anonymized transaction data (not shown) associated with cardholder account 535 may be transmitted from payment processor computer system 112 to third-party computer system 114. In one example, third-party computer system 114 transmits a request (not shown) for anonymized transaction data. The request for anonymized transaction data includes secure identifier 522. In at least some examples, the request for anonymized transaction data also includes authorization token 555 as an indication that the request for access to anonymized transaction data has been previously authorized. In additional examples, the request for anonymized transaction data may include limiters for a range of time, a category of purchases, a list of merchants, and a transaction value limit. In other words, the request for anonymized transaction data may be constrained to a particular time period, a category of purchases, a list of merchants, and a transaction value limit.

Accordingly, payment processor computer system 112 receives the request for transaction data associated with cardholder account 535 and/or cardholder 22. Payment processor computer system 112 processes the request by identifying cardholder account 535 associated with the request. In at least one example, payment processor computer system 112 identifies secure identifier 522 within the request for transaction data, retrieves a record including a reference corresponding to secure identifier 522, and identifies cardholder account 535 associated with secure identifier 522.

Payment processor computer system 112 retrieves transaction data relevant to the request. In at least some examples, relevant transaction data is transaction data responsive to limiters as described above including a range of time, a category of purchases, a list of merchants, and a transaction value limit.

Payment processor computer system 112 anonymizes the transaction data by removing all references to information that may directly identify cardholder account 535 or cardholder 22. Accordingly, payment processor computer system 112 removes, masks, scrambles, or otherwise protects data including a primary account number (PAN), cardholder personally identifiable information (PII), personal identification numbers (PIN), and any other data that may directly identify cardholder account 535 or cardholder 22. The anonymized transaction data is tagged or associated with secure identifier 522 and sent back to third-party computer system 114. Accordingly, third-party computer system 114 may associate the retrieved anonymized transaction data with particular third-party account 515 and provide value-added services such as those described above and herein.

Figure 6:
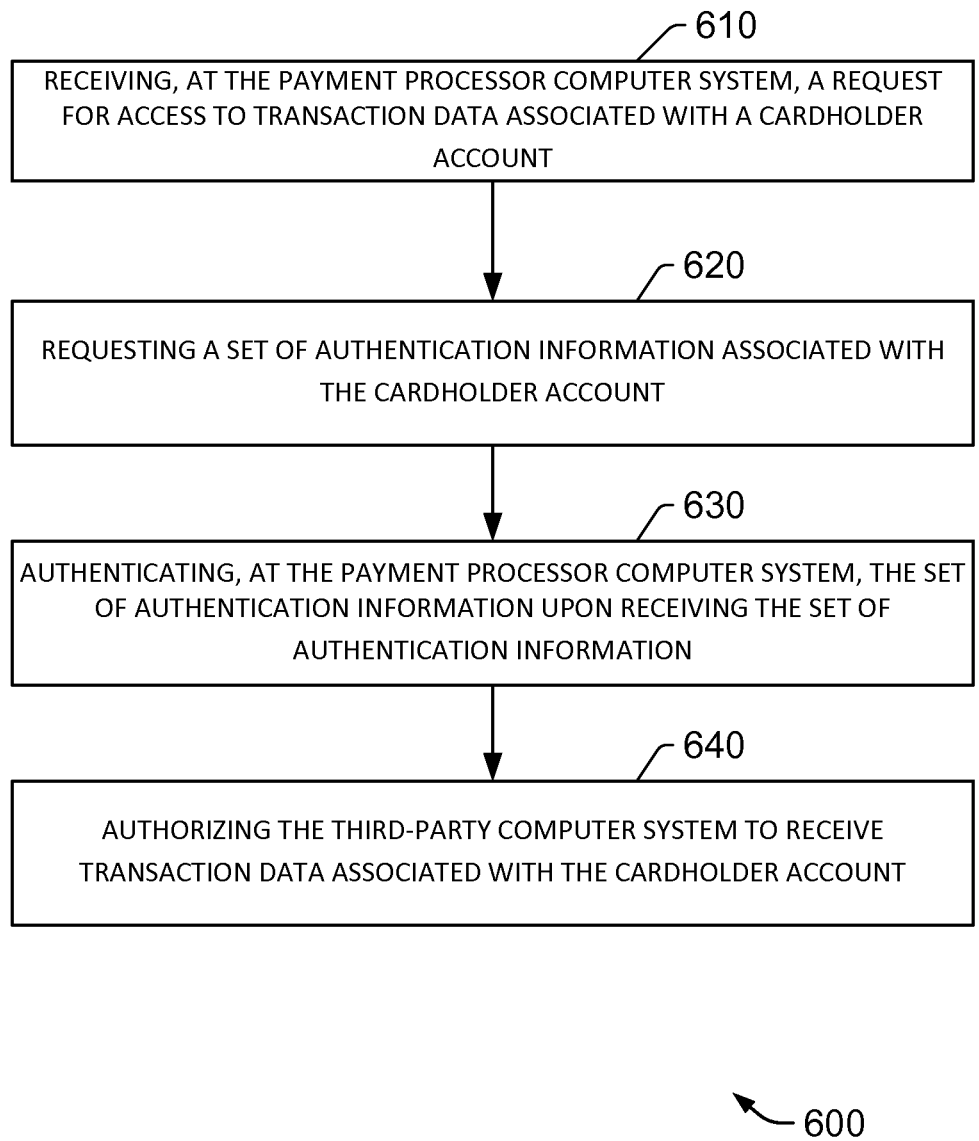

FIG. 6 is a simplified diagram of an example method 600 of authorizing access to anonymized transaction data to a third-party computer system using payment processor computer system 112 (shown in FIG. 2). Payment processor computer system 112 receives 610 a request for access to transaction data associated with a cardholder account. Receiving 610 represents payment processor computer system receiving request 520 (shown in FIG. 5) from third-party computer system 114 (shown in FIG. 5) for access to transaction data associated with cardholder account 535 for cardholder 22.

Payment processor computer system 112 additionally requests 620 a set of authentication information associated with the cardholder account. Requesting 620 represents payment processor computer system 112 requesting authentication information 550 (shown in FIG. 5) via secure transaction mechanism 540 (shown in FIG. 5).

Payment processor computer system 112 also authenticates 630 set of authentication information upon receiving the set of authentication information. Authenticating 630 represents payment processor computer system 112 authenticating and/or validating received authentication information 550 using known authentication and validation methods.

Payment processor computer system 112 further authorizes 640 the third-party computer system to receive transaction data associated with the cardholder account. Authorizing 640 represents at least one of generating and issuing an authorization token 555 (shown in FIG. 5) to third-party computer system 114 or cardholder computing device 23 (both shown in FIG. 5), setting indicator flag 537 and/or authorization token indicator 538 (both shown in FIG. 5), and sending confirmation message 560 (shown in FIG. 5) to third-party computer system 114.

Figure 7:
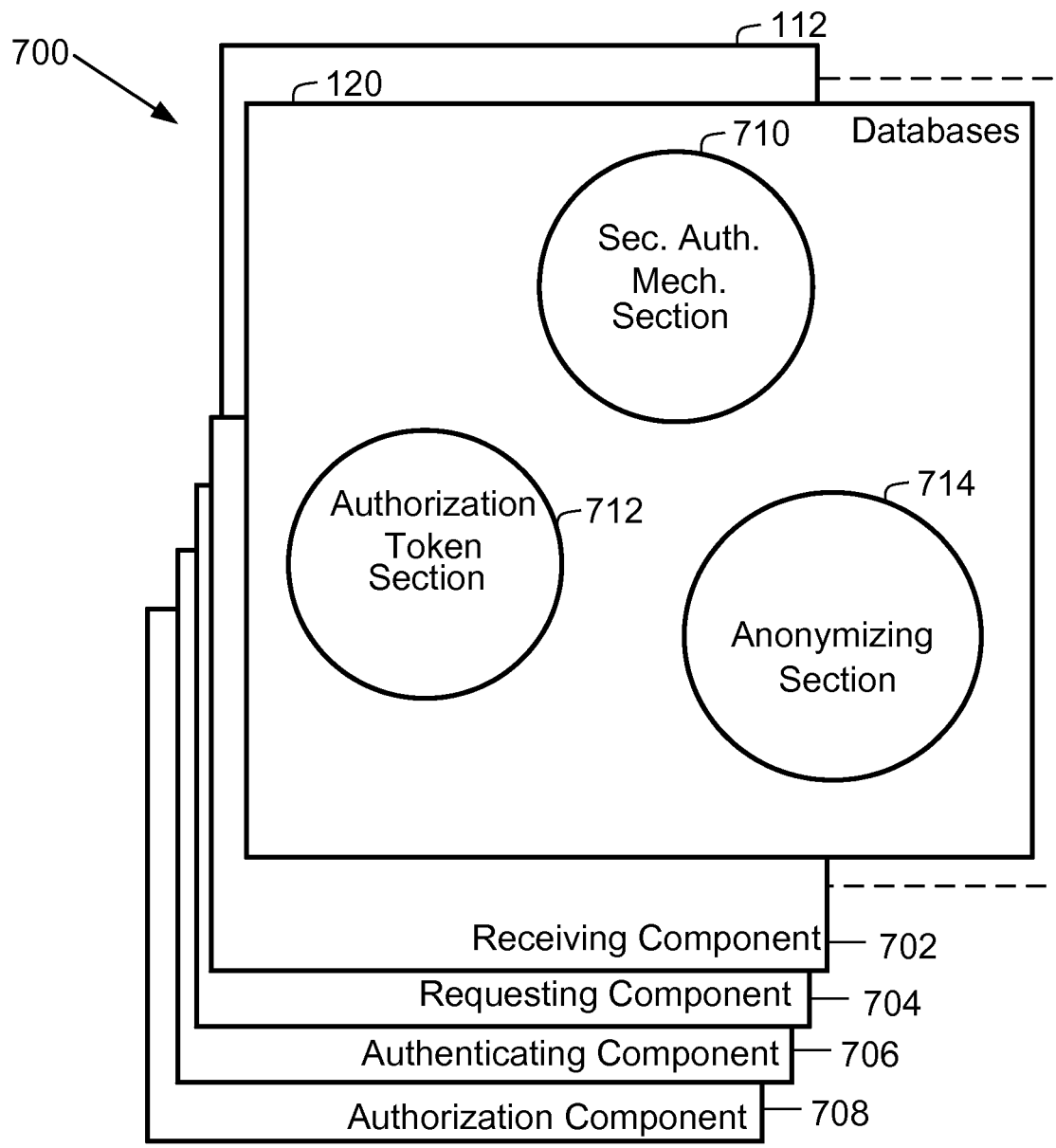

FIG. 7 is a diagram 700 of components of one or more example computing devices that may be used in the environment shown in FIG. 5. FIG. 7 further shows a configuration of databases including at least database 120 (shown in FIG. 1). Database 120 is coupled to several separate components within payment processor computer system 112, which perform specific tasks.

Payment processor computer system 112 includes a receiving component 702 for receiving a request for access to transaction data associated with a cardholder account. Payment processor computer system 112 also includes a requesting component 704 for requesting a set of authentication information associated with the cardholder account. Payment processor computer system 112 additionally includes an authenticating component 706 for authenticating the set of received authentication information. Payment processor computer system 112 further includes an authorizing component 708 for authorizing a third-party computer system to receive transaction data associated with the cardholder account.

In an exemplary embodiment, database 120 is divided into a plurality of sections, including but not limited to, a secure authorization mechanism section 710, an authorization token section 712, and an anonymizing section 714. These sections within database 120 are interconnected to update and retrieve the information as required.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose the disclosure, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method for authorizing access to transaction data by a third-party computer system, the method implemented by a payment processor computer system in communication with a memory, the payment processor computer system further in operable electronic communication with the third-party computer system and a computing device of a cardholder associated with the payment processor computing system, the method comprising:

receiving, by the payment processor computer system from a third-party application executing on the third-party computer system, a request for access to anonymized transaction data, the request including a secure identifier generated by the third-party computer system, wherein the secure identifier identifies a third-party account established between the third-party computer system and the cardholder computing device, and wherein the secure identifier does not contain any information directly identifying a cardholder account of the cardholder and does not contain any information directly identifying the cardholder;

serving, by the payment processor computer system in response to the request for access, a request form in an embeddable frame to the third-party computer system, wherein the request form is configured to request and receive a set of cardholder authentication information from the cardholder, wherein the embeddable frame is configured to embed the request form in the third-party application for presentation by the third-party computer system to the cardholder computing device, wherein the embeddable frame is further configured to communicate the set of cardholder authentication information input at the cardholder computing device directly to the payment processor computer system such that the set of cardholder authentication information input at the cardholder computing device bypasses the third party application and the third party computer system;

receiving, by the payment processor computer system from the cardholder computing device via the embeddable frame, the set of cardholder authentication information;

authenticating, by the payment processor computer system, the set of cardholder authentication information upon receiving the set of cardholder authentication information, the set of cardholder authentication information being received separately from the secure identifier, wherein the step of authenticating includes retrieving from the memory, based on the set of cardholder authentication information, a primary account number associated with the cardholder account;

associating, by the payment processor computer system in the memory, the secure identifier with the identified primary account number;

anonymizing, by the payment processor computer system, transaction data for the authenticated cardholder account; and authorizing, after the step of anonymizing, the third-party computer system to receive the anonymized transaction data associated with the cardholder account.

2. The method of claim 1, wherein serving the embeddable frame further comprises:

generating the request form configured to transmit the set of authentication information directly to the payment processor computer system.

3. The method of claim 1, further comprising:

providing the anonymized transaction data associated with the cardholder account to the third-party computer system, wherein the anonymized transaction data is provided using the secure identifier and contains no personally identifiable information (PII).

4. The method of claim 1, wherein receiving the request for access to anonymized transaction data further comprises:

receiving a third-party identifier associated with at least one of third-party software associated with the third-party computer system and the third-party computer system.

5. The method of claim 1, further comprising:

providing a confirmation message to the third-party computer system upon authorizing the third-party computer system to receive anonymized transaction data associated with the cardholder account.

6. The method of claim 1, wherein receiving the set of cardholder authentication information further comprises:

receiving at least one of the primary account number associated with the cardholder account, a personal name associated with the cardholder account, a personal identification number (PIN) number associated with the cardholder account, and a physical address associated with the cardholder account.

7. The method of claim 1, wherein authorizing the third-party computer system further comprises:

generating an authorization token associated with the cardholder account; and transmitting the authorization token to the third-party computer system.

8. A payment processor computer system for authorizing access to transaction data by a third-party computer system, the payment processor computer system comprising:
a processor; and
a memory coupled to said processor, said processor configured to:
receive from a third-party application executing on the third-party computer system a request for access to anonymized transaction data, the request including a secure identifier generated by the third-party computer system, wherein the secure identifier identifies a third-party account established between the third-party computer system and a computing device of a cardholder, and wherein the secure identifier does not contain any information directly identifying a cardholder account of the cardholder and does not contain any information directly identifying the cardholder;
serve, in response to the request for access, a request form in an embeddable frame to the third-party computer system, wherein the request form is configured to request and receive a set of cardholder authentication information from the cardholder, wherein the embeddable frame is configured to embed the request form in the third-party application for presentation by the third-party computer system to the cardholder computing device, wherein the embeddable frame is further configured to communicate the set of cardholder authentication information input at the cardholder computing device directly to the payment processor computer system such that the set of cardholder authentication information input at the cardholder computing device bypasses the third party application and the third party computer system;
receive, from the cardholder computing device via the embeddable frame, the set of cardholder authentication information;
authenticate the set of cardholder authentication information upon receiving the set of cardholder authentication information, the set of cardholder authentication information being received separately from the secure identifier, wherein the authentication includes retrieving from the memory, based on the set of cardholder authentication information, a primary account number associated with the cardholder account;
associate, in the memory, the secure identifier with the identified primary account number;
anonymize transaction data for the authenticated cardholder account; and
authorize, after the step of anonymization of transaction data, the third-party computer system to receive the anonymized transaction data associated with the cardholder account.

9. A payment processor computer system in accordance with claim 8, wherein the processor is further configured to:
provide the anonymized transaction data associated with the cardholder account to the third-party computer system, wherein the anonymized transaction data is provided using the secure identifier and contains no personally identifiable information (PII).

10. A payment processor computer system in accordance with claim 8, wherein the processor is further configured to:
receive a third-party identifier associated with at least one of third-party software associated with the third-party computer system and the third-party computer system.

11. A payment processor computer system in accordance with claim 8, wherein the processor is further configured to serve the embeddable frame by:
generating the request form configured to transmit the set of cardholder authentication information directly to the payment processor computer system.

12. A payment processor computer system in accordance with claim 8, wherein the processor is further configured to:
provide a confirmation message to the third-party computer system upon authorizing the third-party computer system to receive anonymized transaction data associated with the cardholder account.

13. A payment processor computer system in accordance with claim 8, wherein the processor is further configured to:
validate at least one of the primary account number associated with the cardholder account, a personal name associated with the cardholder account, a personal identification number (PIN) number associated with the cardholder account, and a physical address associated with the cardholder account.

14. A payment processor computer system in accordance with claim 8 wherein the processor is further configured to:
generate an authorization token associated with the cardholder account; and
transmit the authorization token to the third-party computer system.

15. A non-transitory computer-readable storage medium for authorizing access to transaction data by a third-party computer system, the non-transitory computer-readable storage medium having computer-executable instructions embodied thereon, wherein, when executed by at least one processor, the computer-executable instructions cause the processor to:
receive from a third-party application executing on the third-party computer system a request for access to anonymized transaction data, the request including a secure identifier generated by the third-party computer system, wherein the secure identifier identifies a third-party account established between the third-party computer system and a computing device of a cardholder, and wherein the secure identifier does not contain any information directly a cardholder account of the cardholder and does not contain any information directly identifying the cardholder;
serve, in response to the request for access, a request form in an embeddable frame to the third-party computer system, wherein the request form is configured to request and receive a set of cardholder authentication information from the cardholder, wherein the embeddable frame is configured to embed the request form in the third-party application for presentation by the third-party computer system to the cardholder computing device, wherein the embeddable frame is further configured to communicate the set of cardholder authentication information input at the cardholder computing device directly to the payment processor computer system, and wherein the embeddable frame is an authentication computer screen enabling the cardholder to securely input a set of cardholder authentication information into the computing device of the cardholder such that the set of cardholder authentication information input at the cardholder computing device bypasses the third party application and the third party computer system;

receive, from the cardholder computing device via the embeddable frame, the set of cardholder authentication information;

authenticate the set of cardholder authentication information upon receiving the set of cardholder authentication information, the set of cardholder authentication information being received separately from the secure identifier, wherein the authentication includes retrieving from the memory, based on the set of cardholder authentication information, a primary account number associated with the cardholder account;

associate, in the memory, the secure identifier with the identified primary account number;

anonymize transaction data for the authenticated cardholder account;

authorize, after the step of anonymization of transaction data, the third-party computer system to receive the anonymized transaction data associated with the cardholder account.

16. The computer-readable storage media in accordance with claim 15, wherein the computer-executable instructions cause the processor to:

generate an authorization token associated with the cardholder account; and transmit the authorization token to the third-party computer system.

\* \* \* \* \*